Jan. 15, 1952 R. D. SLAYTON 2,582,218

ELECTRONIC START-STOP TO MULTIPLEX EXTENSOR

Filed Oct. 15, 1948 4 Sheets-Sheet 1

FIG. I

INVENTOR
RANSOM D. SLAYTON
BY Emery Robinson
ATTORNEY

Jan. 15, 1952 R. D. SLAYTON 2,582,218

ELECTRONIC START-STOP TO MULTIPLEX EXTENSOR

Filed Oct. 15, 1948 4 Sheets-Sheet 2

INVENTOR
RANSOM D. SLAYTON
BY Emery Robinson
ATTORNEY

Jan. 15, 1952 R. D. SLAYTON 2,582,218

ELECTRONIC START-STOP TO MULTIPLEX EXTENSOR

Filed Oct. 15, 1948 4 Sheets-Sheet 3

INVENTOR
RANSOM D. SLAYTON
BY Emery Robinson
ATTORNEY

INVENTOR
RANSOM D. SLAYTON
BY Emery Robinson
ATTORNEY

Patented Jan. 15, 1952 2,582,218

UNITED STATES PATENT OFFICE 2,582,218

ELECTRONIC START-STOP TO MULTIPLEX EXTENSOR

Ransom D. Slayton, Lombard, Ill., assignor to Teletype Corporation, Chicago, Ill., a corporation of Delaware Application October 15, 1948, Serial No. 54,775

21 Claims. (Cl. 178—2)

Figure 1:
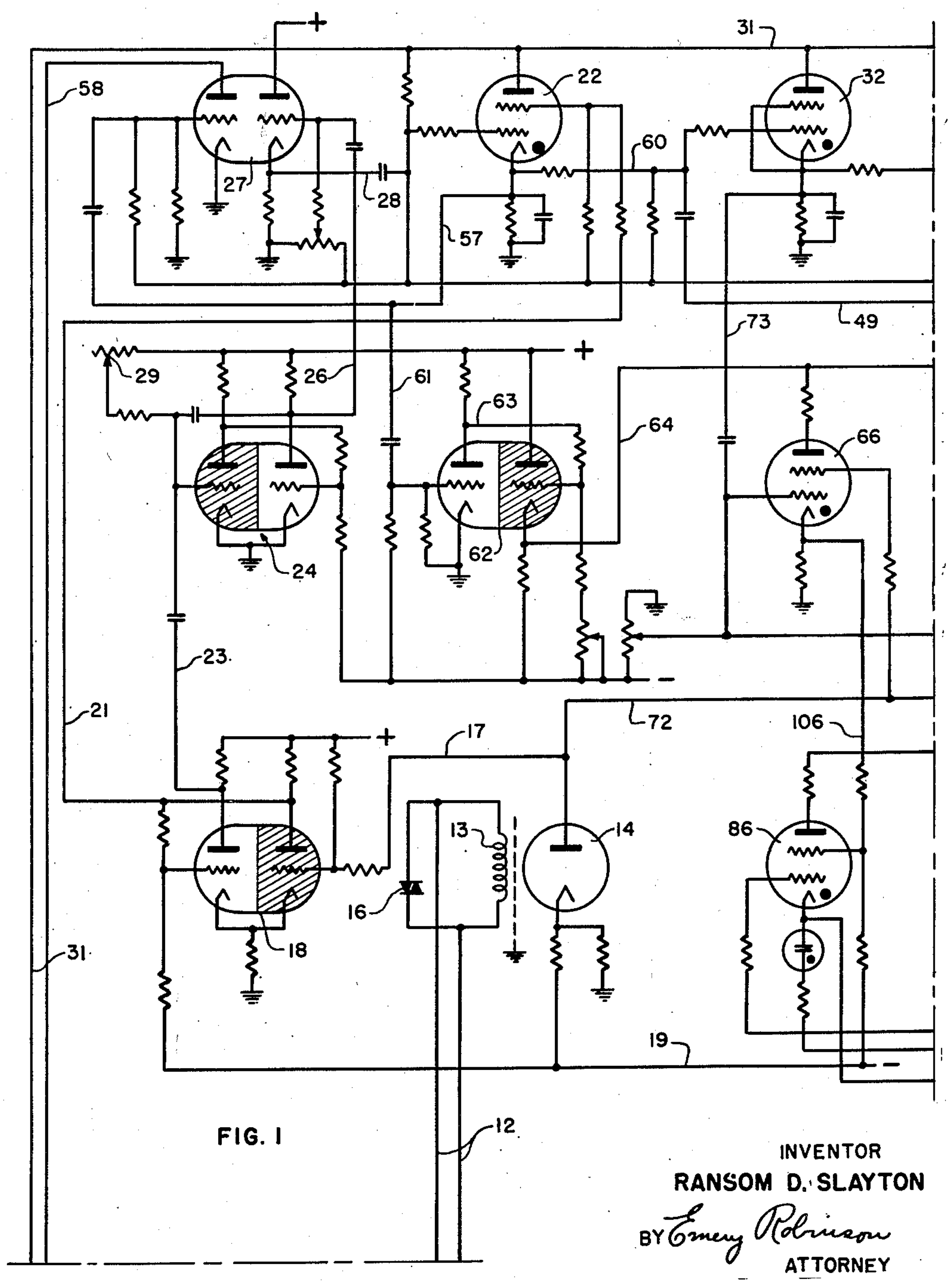
Figure 2:
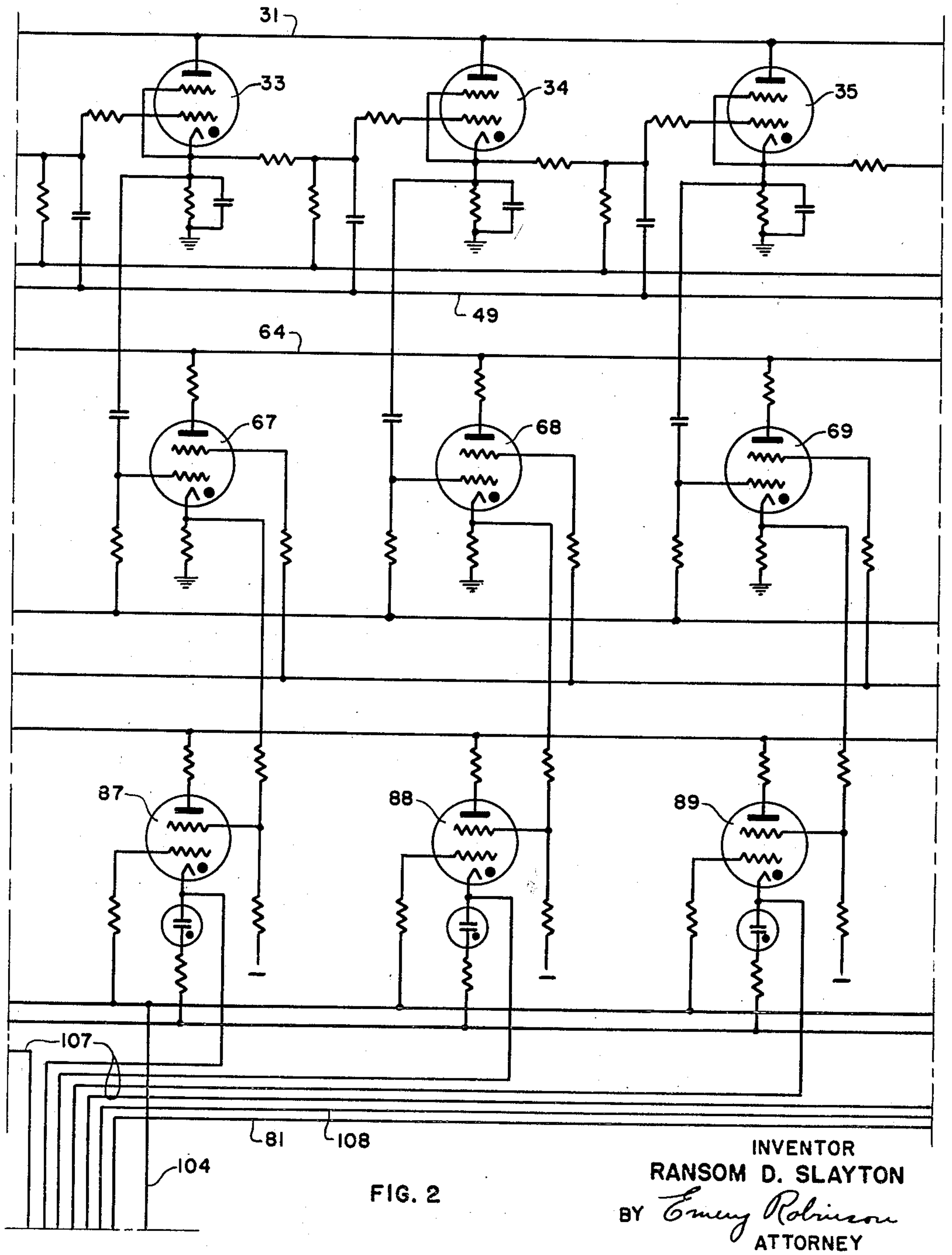
Figure 3:
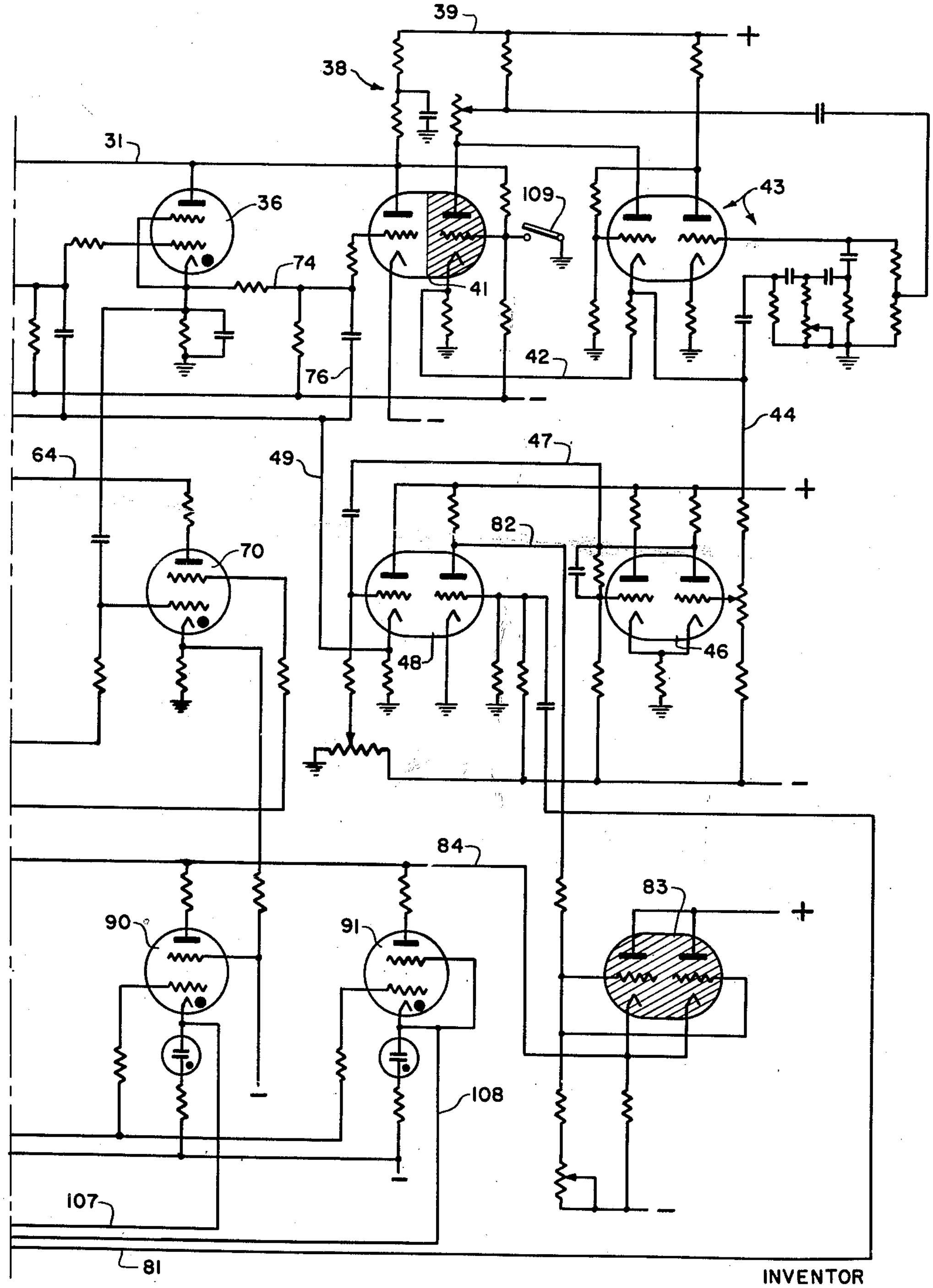

The present invention relates to converters and more particularly to an electronic converter for transposing start-stop to multiplex telegraph signals.

The use of start-stop to multiplex telegraph code converters is not new in the telegraph field, the same being utilized in many systems where start-stop signals from initiating devices are fed into multiplex systems. The necessity for such is that in many instances start-stop terminal apparatus is available, but because of the large volume of communication arising from that station destined for another station it is uneconomical to provide a number of parallel circuits to transmit such communication, and more desirable to use a single circuit and a multiplex system with each start-stop channel utilizing only a portion of the line time thereof.

The known and utilized converters are mainly mechanical in nature and therefore are subject to the normal wear that is present in mechanical apparatus. Further, mechanical apparatus often require much regulation and adjustment, making it necessary to warrant servicing and maintenance. Further, the operating speed and accuracy of mechanical apparatus are controlled by limitation of weight and inertia.

Accordingly, an object of the present invention is to provide a start-stop to multiplex converter utilizing electronic devices as entirely as possible.

A second object of the invention is to provide an electronic start-stop to multiplex converter which is low in initial cost and is free from the requirement of repeated adjusting.

A further object of the invention is to provide a converter which has few mechanical limitations.

A still further object of the invention is to provide an electronic start-stop distributor having no elements operating during a period of normal nonuse of the unit.

Another object of the invention is to provide an electronic start-stop distributor under the control of a start-stop oscillator which is triggered off upon the deliverance of a start-stop signal to the converter.

Still another object of the invention is to provide a start-stop to multiplex converter which will be operated automatically upon the receipt of a signal condition but which will not operate in response to minor hits on the line.

A yet further object of the invention is to provide a converter having no elements operating during a period of failure of the associated start-stop circuit.

A further object of the invention is to provide an electronic start-stop to multiplex converter which is responsive to code signals from a start-stop source for storing such signals, and is also responsive to a multiplex distributor for transferring the stored signals to the multiplex distributor for transmission over the signaling channel.

The start-stop to multiplex converter comprises generally a normally quiescent start-stop oscillator which controls an electronic start-stop distributor of the chain type. The release of the oscillator is under the control of the receipt of a signal condition with means provided to prevent the operation of the apparatus if an abnormal line condition such as a short hit is registered instead of a start signal impulse. The incoming start-stop signals are stored in a plurality of selector tubes equal in number to the unit code being utilized. Once the signals are stored in the selector tubes, transfer means are provided which are under the control of the associated multiplex distributor for transferring the signals from the selector tubes to a plurality of storage tubes from whence connection is made to the transmitting multiplex distributor so that the signals may be transmitted over a signaling channel. Means are further provided to allow the transmission of a blank signal in the event that a code signal is not stored in the converter at the time determined for transference to the multiplex transmitting distributor.

The present invention is distinguished from my copending application Serial No. 54,776, filed on October 15, 1948, now Patent No. 2,536,578, dated January 2, 1951, in that the latter application discloses and claims a multiplex to start-stop converter.

Figures 4, 5:
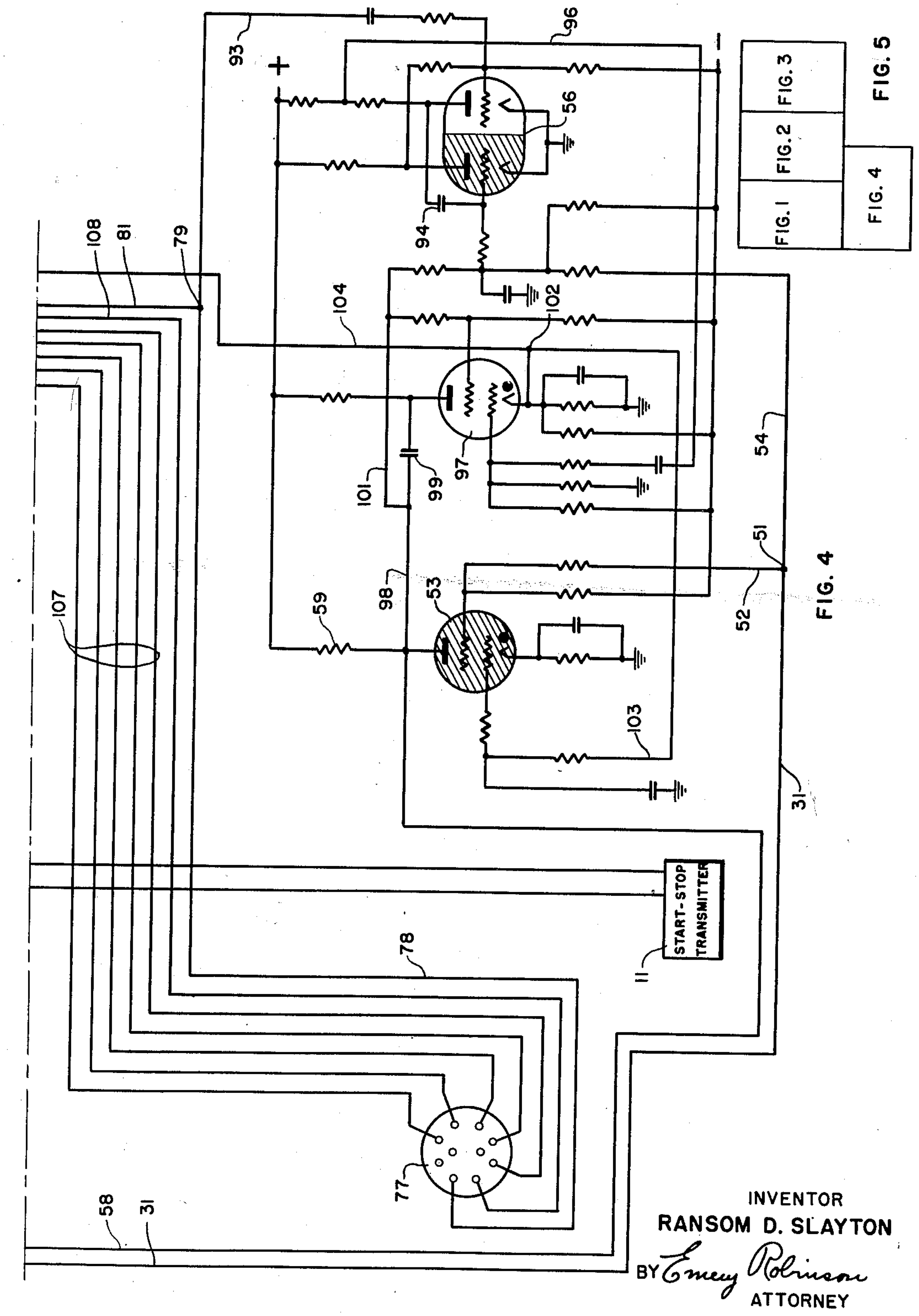

A more complete understanding may be had of the invention when the following detailed description thereof is read in conjunction with the accompanying drawings, which illustrate as follows:

Figs. 1 to 4, inclusive, illustrate diagrammatically the components forming the present invention; and Fig. 5 is a block diagram illustrating the proper arrangement of Figs. 1 to 4, inclusive, to form an operative apparatus.

Referring to Fig. 4 it may be seen that a start-stop signal initiating device 11 is provided for impressing signals over a pair of conductors 12 comprising a signaling channel to the operating coil 13 of a magnetic diode tube 14. There is no electrical connection between conductors 12 and magnetic diode 14 other than the magnetic field of coil 13. With respect to the signal originating mechanism 11, such may be a tape sensing device, which is well known in the art, or may be any other obtainable mechanism which is suitable for such a purpose. The conductors 12 may be connected to the diode 14 at a station local with respect to the signal initiating device 11 or may form a signaling channel connecting the magnetic diode 14 to a distant station. In either event and irrespective of the type of signal initiating means, the apparatus will work satisfactorily. It might be noted that a stabilizing varistor or nonlinear resistor 16 has been placed in shunt relationship with respect to the operating winding 13 in order to stabilize such winding and short circuit any high transient potentials which may occur due to the inductive reactance of winding 13 when the signaling current is abruptly turned on or off.

The magnetic diode 14 is of such construction that it will conduct during a spacing or no current condition in the conductors 12 and winding 13 and will be nonconducting during an interval of marking or current conducting condition in the conductors 12 and operating winding 13.

If it be assumed that a steady marking condition exists on the line or signaling channel which indicates normally in telegraph practice that there are no signals to be transmitted, in the converted form, over the multiplex transmitter, the diode 14 will be in a nonconducting condition. Under this condition the anode circuit of the diode will be impressed with positive potential from a suitable source over a conductor 17. Likewise, under this condition the grid of the right-hand triode portion of a signal shaper twin vacuum triode 18 will receive the same positive potential thereby causing the right portion thereof to be normally conducting. Under this condition the converter is in an unoperative condition with no signals being passed on to the multiplex distributor for transmission over the signaling channel.

During the unoperative condition various of the tubes comprising the converter will be in a steadily conducting condition. However, it is deemed desirable not to make mention of these tubes at this time but instead to incorporate such in the operating description of the converter wherein at such time as it is mentioned that a tube is rendered conducting or nonconducting an indication will be given as to the normal condition of the tube and its effect on the system, if any, at such time.

If it be now assumed that a spacing condition is received in the coil 13 of the magnetic diode 14, such condition normally signifying a start condition prior to the individual code impulses of a start-stop signal, the magnetic diode 14 will be allowed to conduct. It may further be assumed at this time that the received condition is that of an actual start-stop signal, a description being given hereinafter dealing with the effect of such spacing condition being a hit or some other abnormal line condition when no signals actually should be received by the converter.

The effect of the diode becoming conducting is that negative battery from a suitable source will be impressed over a conductor 19 to the cathode of the diode and thence through the diode to the conductor 17, mentioned previously. Negative potential on the conductor 17 passes through an appropriate resistor to the grid of the normally conducting positively biased right-hand triode of the tube 18. Such results in the positive grid of the right-hand triode of the tube 18 being started toward cutoff thereby causing such triode to begin reducing its conduction.

Upon the right-hand portion of the tube 18 reducing conduction the potential in its anode circuit will be increased resulting in increased potential to the normally negatively biased grid of the left-hand portion of the tube 18, over an obvious circuit. Such results in the left-hand portion of the tube 18 beginning conduction, increasing the cathode potential of both triodes. This is in effect a further addition of negative bias to the grid of the right-hand triode of tube 18, further cutting off the latter and increasing its anode potential. The effect is accumulative so that the right-hand triode of tube 18 is almost instantly completely cut off and the left portion of the same tube made fully conducting. A rounded off line signal transition applied to magnetic diode 14 will thus be squared up in signal shaper tube 18.

Also, during the period that the right-hand portion of the tube 18 is not conducting with a resulting increased anode potential, the potential will likewise be increased on a conductor 21 which is connected in the anode circuit and which is also connected through a suitable resistor to the normally negatively biased screen grid of a gas filled start tube 22. The tube 22 is of such type that once it is rendered conducting it will continue to do so irrespective of grid potential until the proper change is made externally in its anode or cathode circuit. However, the tube 22 is not rendered conducting at this time inasmuch as the potential on the screen grid is not sufficient in itself to cause the tube 22 to be rendered conducting but instead serves as a conditioning potential only; the tube being rendered conducting in a manner to be described hereinafter.

At the time that the left-hand portion of the tube 18 is rendered conducting the potential in its anode circuit will decrease resulting in a similar decrease in potential on a conductor 23 connected thereto and which is also connected through a condenser to the normally positively biased grid circuit of the normally conducting left-hand portion of a biased multi-vibrator indicated generally by the numeral 24. This results in the application of a negative impulse to the grid circuit. It is not deemed necessary to describe in detail the operation or circuit structure of the biased multivibrator as the same and its theory of operation is well known to those versed in the art. The general operation of the multivibrator, however, is that upon the receipt of the negative pulse on the positively biased grid, that tube portion will be rendered nonconducting and the opposing portion will be rendered conducting for a period of time necessary for the negative charge caused by the drop in potential of the opposing portion anode to leak from a condenser attached to the grid, whereupon the two portions will resume their normal conditions.

In accordance with this operation, as the right-hand portion of the multivibrator 24 becomes conducting, its anode potential will drop, the same having no effect to cause any operation through a conductor 26 connected thereto. After the time delay necessary for the charge to leak from the condenser, the multivibrator 24 will resume its normal condition with the left portion conducting and the right portion nonconducting.

At this time the anode potential in the right portion will once again increase with a resultant increase in potential to the conductor 26, and through a condenser, forming a positive impulse to the normally negatively biased grid of the right-hand start pulse portion of a twin vacuum triode 27.

Upon the right-hand portion of the tube 27 being rendered momentarily conducting, a positive potential impulse will be impressed from its cathode output circuit over a conductor 28 and through a suitable condenser and resistor to the normally negatively biased control grid of the start tube 22. As was described previously, a conditioning potential was being applied to the screen grid of the tube 22, and therefore, with the positive operating potential being impressed on its control grid the tube 22 will be rendered conducting.

In the event that the spacing condition in the magnetic diode 14 had not been a start condition indicative of the receipt of a signal, but instead had been a hit or abnormal momentary condition on the conductors 12, the magnetic diode 14 would become nonconducting after the receipt of such abnormal condition. Upon this occurrence a conducting condition would exist in the right-hand portion of the tube 18 and therefore a negative potential condition would exist with the conductor 21 no longer supplying conditioning potential to the screen grid of the tube 22. Therefore, if the operating potential were to be applied by the right-hand portion of the tube 27 being rendered conducting, the tube 22 still would not be rendered conducting. It might be noted that the time of delay during which an abnormal spacing condition may exist on the line and the start tube 22 not be triggered off is dependent with respect to and may be varied by the variable resistor 29 in the circuit of the mutlivibrator 24. It is obvious, however, that there must be some margin of distinction between the spacing impulse indicative of the signal and the abnormal line condition in order that the apparatus may function properly.

The anode of the start tube 22 is connected by means of a common conductor 31 to the anodes of five other gas filled distributor tubes 32 to 36, inclusive. The conductor 31 is also connected through a common anode resistor indicated generally by the numeral 38 and over a conductor 39 to a source of positive potential. A further connection of the conductor 31 is through a resistor to the grid of the normally conducting right-hand oscillator control portion of a twin vacuum triode tube 41.

It was mentioned previously that the start tube 22 was rendered conducting and under this condition and because of the use of the common anode resistor 38 the potentials of the anodes attached to conductor 31 will decrease and the grids connected to the conductor 31 will all become negative. Thus, at this time the right-hand portion of the tube 41 will be rendered nonconducting.

Upon the right-hand portion of the tube 41 being rendered nonconducting, positive potential will no longer be impressed from its cathode output circuit and over a conductor 42 to the cathode of the left-hand portion of a start-stop oscillator indicated generally by the numeral 43, and the common anode potentials of the two triodes will rise. No detailed description will be given of the start-stop oscillator 43 as its structure and operation may be learned in detail by reference to U. S. Patent No. 2,373,737 issued on April 17, 1945, to M. Artzt.

The start-stop oscillator 43 is of a type which once released for operation will operate immediately always starting on a negative cycle and when blocked will stop almost immediately at a neutral position. The sine wave output of the start-stop oscillator 43 is impressed over a conductor 44 to the normally neutrally biased grid of the right-hand portion of squaring amplifier vacuum tube 46. The circuit of tube 46 is of the same general type as that of signal shaper tube 18, which results in a square wave output on its output conductor 47 which is 180° out of phase with the sine wave input. The square wave is impressed from the conductor 47 through a condenser to the normally negatively biased grid of the left-hand pulse amplifier portion of a twin vacuum triode 48. The resultant succession of positive impulses from the left-hand portion of the tube 48 is impressed from its cathode output circuit on a conductor 49.

The common conductor 31 also extends to a junction point 51 and thence over a branching conductor 52 and through a suitable resistor to the screen grid of a normally conducting gas filled tube 53. As the tube 53 is of the type that once rendered conducting continues to conduct irrespective of grid potential until an alteration is made in the anode or cathode circuit, the negative condition on the conductor 31 due to the common anode resistor 38 and the tube 22 conducting will have no effect at this time with respect to the tube 53. The conductor 31 also extends from junction point 51 over a conductor 54 to the grid of the normally conducting left-hand portion of an overlap twin triode 56. However, such negative potential is not sufficient to cause the left-hand portion of the triode 56 to be rendered nonconducting.

At the instant that the tube 22 becomes conducting, positive potential will be impressed from its output cathode circuit to a conductor 57 and through a condenser to the normally negatively biased grid of the left-hand portion of the tube 27. The left-hand portion of the tube 27 will be rendered momentarily conducting by the positive impulse at this time. As the left-hand portion of the tube 27 conducts, and because of the connection from its anode over a conductor 58 to the anode of the tube 53 which are both connected to a source of positive battery through a common anode resistor 59, the tube 53 will be rendered nonconducting. The extinguishment of tube 53 will have no operating effect at this time but is for a purpose which will be described hereinafter.

Also during the interval of conduction of the tube 22, potential will be impresed from its output cathode circuit over a conductor 60 and through appropriate resistors to the normally negative biased control grid of the distributor tube 32. This potential is not sufficient in itself to cause the tube 32 to be rendered conducting but instead acts as a conditioning potential for the tube 32. The conditioning potential does not appear instantaneously at the grid of tube 32, but is delayed by the necessity of charging the grid condenser through the resistor network.

It was mentioned previously that a positive pulse output was impressed on a common conductor 49 which it may be noted is connected through suitable condensers to the control grids of the five distributor tubes 32 to 36, inclusive. Thus, assuming, as described above, that the tube 32 is receiving conditioning potential from its succeeding tube 22, the tube 32 will be rendered conducting upon the receipt of the first pulse on the conductor 49 after the application of the conditioning potential. Such pulse results, as described previously, through the operation of the start-stop oscillator 43. Inasmuch as the anodes of the tubes 22 and 32 are both connected by the conductor 31 to the common anode resistor 38, the tube 22 will be extinguished upon the tube 32 being rendered conducting.

If it is desired to obtain a complete description of the theory and operation of the extinguishment of tubes through the use of common anode resistors, the same may be had by reference to U. S. Patent No. 2,412,642, issued to Wilkerson on December 17, 1946, wherein a complete and detailed description is given.

At the instant of conduction of the tube 22, potential is also impressed on a conductor 61 which branches from the conductor 57 described previously as being connected in the cathode circuit of the tube 22. The conductor 61 is connected through a condenser to the normally negatively biased grid of the left-hand portion of a twin triode selector release vacuum tube 62. With the resulting positive impulse impressed on the grid of the left-hand portion of the tube 62 the same will be rendered conducting resulting in a drop in potential in its anode circuit. As the anode circuit of the left-hand portion of the tube 62 is connected by a conductor 63 through a resistor to the grid of the normally conducting right-hand portion of the tube 62, such second portion will be rendered nonconducting. The above operation will be momentary only and thereafter the portions of the tube will return to their normal conditions.

The cathode circuit of the right-hand portion of the tube 62 is connected to negative battery and also by a conductor 64 and through appropriate individual resistors to the anodes of five gas filled selector tubes 66 to 70, inclusive. No other source of potential exists for the anodes of the tubes 66 to 70, inclusive, and therefore at such time as the right-hand portion of the tube 62 is rendered nonconducting, positive anode potential will be removed from all of the tubes 66 to 70, inclusive, thereby causing the extinguishment of any of such tubes which may have been conducting at this time. The initiation of conduction in the tubes 66 to 70, inclusive, will become apparent during the remainder of the present description.

The frequency of the impulses on the conductor 49 resulting from the output of the start-stop oscillator 43 is so timed that they occur equidistantly at approximately the midpoint of the start-stop signals being received over the conductors 12 to the magnetic diode 14. The relative delivery time of the impulses may be regulated by operation of range control variable resistor 29. The apparatus is further timed so that the start tube 22 will become conducting during the receipt of the spacing start interval in the magnetic diode 14. However, as it is not desired to utilize the start and stop pulses of the received start-stop signals for transmission, the same are utilized only for control purposes, the use of the start pulse having been described above.

A description was given above of the initiation of conduction in the tube 32 which is assigned to the No. 1 impulse interval of the received signals. The remainder of the tubes 33 to 36, inclusive, will be rendered conducting in succession, each of the tubes being rendered so conducting by receiving conditioning potential during the period of operation of the preceding tube and upon the receipt of operating potential by an impulse on the conductor 49. The tubes 33 to 36, inclusive, are assigned to the Nos. 2 to 5 impulse positions of the received start-stop signals. At such time as any of the tubes 32 to 36, inclusive, are rendered conducting, any of the other of the tubes in the chain will be extinguished through the use of the common anode resistor 38, as has been described previously with respect to the tube 22.

After the receipt of the spacing start impulse in the magnetic diode 14, the No. 1 impulse will be received in the operating winding 13. The same may be either spacing or marking depending on the particular character which is received in the instant apparatus and which is to be transmitted over the multiplex channel. If it be assumed that the impulse is a marking condition the diode 14 will be rendered nonconducting as was previously described. With the diode 14 in a nonconducting condition, its anode potential will rise resulting in increased potential on a common conductor 72 connected to the anode of the diode and through branching conductors and individual resistors to the screen grids of the five selector tubes 66 to 70, inclusive. However, none of the tubes 66 to 70, inclusive, will be rendered conducting through the conditioning potential on the conductor 72 by itself as the same is not sufficient to overcome the negative bias to those tubes to allow them to conduct.

This condition of the diode 14 and its following conditions upon the receipt of the succeeding received signal impulses will be reflected in the conductor 17 to the grid of the right-hand portion of the tube 18 described previously as being normally conducting. The condition of the right-hand portion of the tube 18 will also be reflected in the conductor 21 leading to the screen grid of the start tube 22. However, the start tube 22 may not be rendered conducting regardless of the condition of its screen grid or its control grid through the tubes 24 and 27 because one of the distributor tubes 32 to 36, inclusive, will be conducting at such time and therefore through the use of the common anode resistor 38 the potential of conductor 31 will be so reduced that the network from conductor 31 to negative battery will hold the grid of the tube 22 too far negatively biased.

At the instant that tube 32 becomes conducting, which will occur at approximately the midpoint of the interval of receipt of the No. 1 signal impulse in the diode 14, it will impress positive potential from its output cathode circuit over a conductor 73, and through a condenser to the normally negatively biased control grid of the No. 1 selector tube 66. With the described marking condition on the line and positive potential impressed over the conductor 72 to the screen grid of the tube 66, such tube will be rendered conducting by the control grid impulse. None of the other tubes 67 to 70, inclusive, will be rendered conducting in response to the marking impulse as reflected in potential applied to the conductor 72 at this time as the tube 66 is the only one of the selector tubes receiving operating potential from its associated distributor tube 32.

If the No. 1 received impulse had been spacing instead of marking the diode 14 would be rendered conducting. During this condition the conductor 72 would receive negative potential from the conductor 19 and through the diode 14, the same being impressed on the branching conductors to the screen grids of the tubes 66 to 70, inclusive. Therefore, at such time as the control grid of the tube 66 received the positive potential impulse from its associated distributor tube 32, over the conductor 73, the tube 66 will not be rendered conducting, as the potential applied will not be sufficient to cause the same to occur.

In view of the above description it may be seen that depending on whether a marking or spacing condition exists on the line during the receipt of the No. 1 impulse, the tube 66 will either be rendered conducting or nonconducting, respectively, in accordance with such signal.

After the receipt of the No. 1 impulse the magnetic diode 14 will be operated successively for each of the remaining four impulses comprising the five unit code signal. During the receipt of the individual impulses the distributor tubes 33 to 36, inclusive, will have been operated successively impressing potential impulses to the control grids of their associated selector tubes 67 to 70, inclusive, the latter being rendered conducting or remaining not conducting in accordance with the received signal impulses as impressed from the diode 14 over the conductor 72 to the screen grids of those tubes. Thus, it may be seen that upon receipt of the five signal impulses the selector tubes 66 to 70, inclusive, will be operating or not operating in accordance with such signals. It should also be noted that the control grids and screen grids have about equal control of gas tube firing, and that the control grid and screen grid circuit connections are interchangeable with approximately the same results.

At such time as the distributor tube 36 is conducting its output potential will be applied not only to its associated selector tube 70 but also over a conductor 74 and through suitable resistors to the grid of the normally nonconducting left-hand stop portion of the tube 41. The left-hand portion of the tube 41 will not be rendered conducting at this time as the grid thereof is still somewhat negative with respect to the cathode of the same portion. However, at such time as the next positive impulse is received from the start-stop oscillator 43 through the squaring amplifier 46 and pulse amplifier 48 to the conductor 49, added potential will be impressed over the branch conductor 76 and through the condenser and resistor connections to the grid of the left-hand portion of the tube 41. With such operating potential being applied to this grid, and simultaneously the conditioning potential being received from the conductor 74, the left-hand portion of the tube 41 will be rendered conducting.

Upon the left-hand portion of the tube 41 being rendered conducting, and because its anode is connected to the conductor 31 and the common anode resistor 38, the No. 5 impulse distributor tube 36 will be extinguished, as described previously, from the operation of a common anode resistor. The cathode of stop triode 41 connects to negative battery so that when conducting the anode potential will be sufficiently reduced. However, he left-hand portion of the tube 41 will conduct momentarily only as it is a vacuum tube and the operating pulse received over the conductors 49 and 76 to the grid thereof is of short duration only. Thereafter that portion of the tube will become nonconducting and the potential of common anode conductor 31 rises to normal since none of the other distributor tubes 32 to 36, inclusive, will be conducting at this time. The start tube 22 will be reconditioned by the increase in potential of conductor 31 in anticipation of the reception of the next start impulse through tubes 14, 18, 24, and 27. The grid of the right-hand oscillator control portion of the tube 41 will also be biased positively exceeding the normal negative bias and allowing that portion of the tube to be rendered conducting.

Upon the right-hand portion of the tube 41 being rendered conducting, potential will be impressed from its cathode output circuit over the conductor 42 to the start-stop oscillator tube 43, and the common anode potential will also fall, preventing tube 43 from oscillating further. Thus, it may be seen that during the interval that the stop marking impulse exists on the conductors 12, whether it be the stop impulse for an individual character or a stop condition signifying no further characters on the line, the start-stop oscillator 43 will be rendered unoperative. The same condition will occur for an open circuit 12, the converter requiring a mark-to-space signal transition in order to cause an operating cycle, and remaining quiescent unless such a signal is received. Under the above conditions no impulses will be initiated for causing the operation of the distributor.

It might be noted at this time that a normally open manually operable switch 109 is connected to ground and associated with the grid of the right-hand portion of the tube 41. If the switch 109 were to be closed, placing the grid at ground potential, the right-hand portion of the tube 41 would be rendered nonconducting and the start-stop oscillator 43 would be released for operation. The distributor would not operate unless a start impulse were also received from line signal 12. This allowance of free running of the oscillator 43 is provided so that the oscillator may be calibrated and adjusted to its desired frequency output.

Such a frequency measurement may be made by applying the continuous signal to the input terminals of a cathode-ray oscilloscope along with the signals from a source of known frequency. A variable resistor in the oscillator circuit 43 allows frequency adjustment.

The idle condition will exist during the reception of the marking stop impulse with the apparatus being operated for another cycle upon the receipt of the succeeding start impulse, all as described above. Thereafter the apparatus will continue to operate as described until such time as no further signals are available for transmission from the start-stop initiating apparatus over the multiplex system. At the time the steady stop impulse from the last character transmitted is received, the automatic operation of the right-hand portion of the tube 41 will have occurred, as described above, to block further operation of the start-stop oscillator 43, and place the equipment in its unoperative condition. Thereafter, as the normal start-stop signal is marking on the line during periods of no transmission the apparatus will be retained in its unoperative condition. The apparatus will remain in this condition until there are more signals available for transmission at which time the receipt of the start impulse associated with the first character by the magnetic diode 14 will cause the apparatus to be released for operation as was described initially. The same conditions hold if the line circuit 12 goes open, the apparatus being released for one cycle, then retained inoperative until the circuit recloses and then reopens again.

In telegraph practice it is normal procedure to operate a multiplex system at a speed faster than that utilized for start-stop systems. Therefore, it may be understood that during the reception of the start-stop signals in the described converter the transfer thereof to the transmitting multiplex distributor must be under the control of that unit in order for proper multiplex transmission to occur. Further, because of the difference in speeds of the two systems, the multiplex system will be ready to transfer the start-stop signal at various times with respect to the receipt of such signals in the converter. Also, there will be intervals when the next start-stop signal will have not been received by the converter at the time that the multiplex distributor is in readiness to transfer such signal. Accordingly, at such latter time it is desirable that a blank signal be inserted automatically for transmission over the multiplex channel. In the following operational description it will be first assumed that a signal has been received in the selector tubes 66 to 70, inclusive, and that such signal is to be transferred for multiplex transmission, the difference of speed and its resulting problems being forgotten for the time being.

At such time as the multiplex transmitting apparatus is in readiness to cause a transfer of the signal stored in the selector tubes 66 to 70, inclusive, it will originate a positive operating impulse from the multiplex apparatus over a conductor not shown to a connector 77 and thence over a conductor 78 to a junction point 79. The multiplex operating pulse may originate in mechanical systems from a local segment of the segmented distributor or may originate in electronic equipment over a conductor 609 to a connector 606 in copending application Serial No. 54,772, filed on October 15, 1948, in the name of T. A. Hansen. The connector 606 may then be connected to the connector 77 with the conductor 609 being connected to the conductor 78. The use of an operating pulse from a multiplex system is old in the art and is necessarily used in order to cause the setting up of the succeeding signal for multiplex transmission. It is the usual practice to cause such signal to be set up or transferred just after the preceding signal for that particular channel has been transmitted and of course prior to the multiplex transmitter reaching a position for transmission of the transferred signal.

The operating impulse impressed on the conductor 78 and to the junction point 79 will be further impressed over a conductor 81 and through a condenser to the normally negatively biased grid of the right-hand storage release portion of the twin triode 48. Upon the right-hand portion of the tube 48 being rendered conducting a resulting decrease in potential will exist in the anode circuit thereof. Such potential decrease will likewise result on a conductor 82 connected in the anode circuit and which is also connected by a resistor to the grids of both portions of a normally conducting storage release twin vacuum triode 83. Such potential decrease is caused by the conductor 82 being connected to a negative source, as are the cathodes of both portions of the tube 83, thus resulting in the tube 83 being rendered nonconducting. Upon both portions of the tube 83 being rendered nonconducting the negative potential will be impressed over a conductor 84 which is connected through suitable individual resistors to the anodes of six gas filled storage tubes 86 to 91, inclusive. As the anodes of these tubes receive their only potential through the conduction of the tube 83 any of the tubes 86 to 91, inclusive, which have been conducting previously will be extinguished at this time. As the tube 83 is of the vacuum variety it will only remain nonconducting for a short interval of time equal in length to the time that the right-hand portion of the tube 82 is conducting. This latter portion of the tube is conducting momentarily only due to the multiplex operating impulse on the conductor 81.

The multiplex operating pulse mentioned as being impressed on the conductor 78 to the junction point 79 is also impressed over a conductor 93 and through an appropriate condenser and resistor to the normally negatively biased grid of the right-hand portion of the overlap tube 56. Such overlap tube 56 is a biased multivibrator similar to tube 24, described previously, so that the positive pulse being applied to the grid of the right-hand portion thereof will result in the left-hand normally conducting portion being extinguished for a time necessary for the negative charge to leak from a condenser 94 in the left-hand portion grid circuit. Thereafter the two portions of the tube will resume their normal conditions.

During the interval that the right-hand portion of the tube 56 is rendered conducting its anode potential will decrease resulting in a corresponding decrease of potential on a conductor 96 connected thereto. The conductor 96 is connected through a condenser and a resistor to the normally negatively biased control grid of a gas filled transfer tube 97. This will have no effect on the tube 97 at this time as the decrease in potential will not cause the tube to be rendered conducting and if the tube had been conducting, it would continue to do so irrespective of grid potential.

It should be remembered that during the earlier description of the circuits it was mentioned that the left-hand portion of the tube 27 had been rendered conducting momentarily with a resultant extinguishment of the tube 53, through the use of the common anode resistor 59. The anodes of the tubes 53 and 97 are connected together by a conductor 98 having a commutating condenser 99 in circuit therewith. The conductor 98 also has a branching conductor 101 which is connected through a resistor to the screen grid of the tube 97. Thus, with the tube 53 being extinguished, potential will be supplied from a source of positive battery through the common anode resistor 59 and over the conductors 98 and 101 to the screen grid of the tube 97, such being a conditioning potential.

At such time as the multivibrator or the overlap tube 56 resumes its normal position with the left-hand portion conducting and the right-hand portion nonconducting a rise in potential will occur on the conductor 96 which it was mentioned was connected through a condenser and a resistor to the control grid of the tube 97. Thus, at this time because of the existence of both steady conditioning and operating impulse potentials on the screen and control grids, respectively, of the tube 97, it will be rendered conducting.

During the interval that the tube 97 conducts potential will be impressed from its output cathode circuit to a junction point 102 and thence over a conductor 103 to the control grid of the tube 53. However, this will not be sufficient to cause the tube 53 to be rendered conducting as it necessitates a correspondence of potential on both the control and screen grids for this to occur, as will be described hereinafter.

The positive potential impressed from the tube 97 to the junction point 102 will also be impressed over a conductor 104 through individual resistors to the control grids of the storage tubes 86 to 91, inclusive. This potential will operate as an operating potential, the conditioning potential for these tubes to be described immediately hereinafter.

It is to be remembered that the received signal impulses operated the selector tubes 66 to 70, inclusive, in accordance with the individual impulses, such tubes conducting for a marking condition and being nonconducting for a spacing condition. As the tubes are of the gas filled variety they continue to conduct once rendered conducting irregardless of the impulse condition on the grids thereof. If the tube 66 were to be conducting, for instance, indicating that the No. 1 signal impulse was marking, potential would be impressed from its output cathode circuit over a conductor 106 and through a resistor to the normally negatively biased screen grid of the storage tube 86. A similar condition would exist with respect to the remaining selector tubes 67 to 70, inclusive, in that if they were conducting they would impress potential over individual conductors similar to the conductor 106 to the screen grids of their associated storage tubes 87 to 90, inclusive.

With the above being kept in mind it may be seen that when the transfer tube 97 is rendered conductive and impresses potential over the conductor 104 that such potential applied to the control grids of the tubes 86 to 90, inclusive, acts as an operating potential to cause any of the tubes 86 to 90, inclusive, which may be previously or later conditioned by their associated selector tubes 66 to 70, inclusive, to be rendered conducting when both conditioning potentials appear. Again, it should be noted that the gas storage tube control grid and screen grid circuit connections may be transposed with equivalent results.

The output of the tubes 86 to 90, inclusive, is impressed over individual conductors 107 to the plug 77 from whence corresponding conductors lead to the pertinent elements in a multiplex transmitter. In the event that the present apparatus is utilized with the multiplex system disclosed in the above referred to T. A. Hansen application, the conductors 107 would be connected to the conductors 608 which terminate in a plurality of tubes used in transmission in the multiplex distributor.

It might be noted that there is a sixth storage tube 91 which does not receive any conditioning potential from nor have an associated selector tube. However, the tube 91 will be rendered conducting upon the tube 97 becoming conducting and impressing its output potential on the conductor 104, the latter being connected to the control grid of the tube 91, the screen grid of which is connected to the cathode. Thus, every time that the tube 97 is rendered conducting the tube 91 will likewise be rendered conducting with its potential being impressed over a conductor 108 to the plug 77. This output potential on the conductor 108 may be utilized for any control purpose with respect to the multiplex apparatus that is required to be operated each time that the transfer operation occurs. In particular it is used to identify the blank or all five code impulse spacing combination which may be received from the start-stop transmitter, and must be regenerated and retransmitted from the distant receiving multiplex terminal to a start-stop receiving circuit.

During the interval that the tube 97 is conducting potential is impressed from its output circuit to the junction point 102 and thence over the conductor 103 to the control grid of the tube 53, as mentioned previously. Also, as mentioned previously, the rendering conductive of the start tube 22 had caused the left-hand portion of the tube 27 to be rendered conductive with a subsequent extinguishment of the tube 53 through the common anode resistor 59. The potential impressed on the conductor 103 to the control grid of the tube 53 acts as conditioning potential as it in itself is not sufficient to cause the tube to be rendered conducting.

Upon the receipt of the stop impulse, during which time the start tube 22 and the distributor tubes 32 to 36, inclusive, will be extinguished, potential will rise on the conductor 31 leading to junction point 51 and thence over the conductor 52 to the screen grid of the tube 53. At this time such operating potential will cause the tube 53 to be rendered conducting.

As mentioned previously, the anodes of the tubes 97 and 53 were connected by means of a conductor 98 having a commutating condenser 99 therein. Thus, upon the tube 53 becoming conducting the tube 97 will be extinguished by the passage of a negative impuse through the commutating condenser 99. Thereafter the tube 53 will remain conducting until the receipt of the succeeding start impulse at which time it will be extinguished, all as was described previously.

Because of the fact that in standard practice the multiplex transmitter is made to operate faster than the start-stop apparatus, presently about 2%, it becomes understandable that the invariable receipt of the multiplex operating pulse, which is delayed by tube 56, and the possible rendering conductive of the tube 97 will be variable with respect to the receipt of the start-stop signals over the conductors 12. Actually there are three general conditions which may exist which are as follows: (1) When the delayed multiplex operating pulse is received just after the start impulse is registered in the start-stop distributor. (2) When the delayed multiplex operating pulse is received later than No. 1 above and before the stop impulse is registered in the start-stop distributor, and (3) when the delayed multiplex operating pulse is received during the stop impulse interval of the start-stop distributor. The above conditions exist because it is during the stop interval only that the tube 53 is rendered conducting with the subsequent extinguishment of the transfer tube 97.

If it be considered that the first condition listed above exists, the delayed multiplex operating pulse will be received and will cause the rendering conducting of the transfer tube 97 at some time early in the cycle of reception of the start-stop signals. Inasmuch as the tube 53 is extinguished upon the energization of the start tube 22, which occurs early during the start impulse, the transfer tube 97 may be operated at any time thereafter. The effect of rendering conducting the transfer tube 97 at this time is simply that it will remain conducting and allow a transfer of any impulses received prior to its rendering conducting from the selector tubes 66 to 70, inclusive, to the storage tubes 86 to 90, inclusive. As the tube 97 remains conducting the impulses that are received in the selector tubes after it is rendered conducting will be transferred immediately by the corresponding distributor tubes. It should be noted at this time that the receipt of the multiplex operating pulse for any one channel occurs just after the multiplex signal transmission for that channel. Therefore, during the receipt and storage of the succeeding start-stop signal the multiplex apparatus will be retransmitting signals on its other channels. This allows the reception and storage of all of the code impulses of the start-stop signal prior to their retransmission over the multiplex channels. After the signal cycle is completed and during the subsequent stop pulse interval the tube 53 will be rendered conducting resulting in the tube 97 being extinguished. Thereafter the apparatus will be in readiness for the receipt of the next start-stop signal.

If the second above listed condition exists, namely with the delayed operating pulse being received before the receipt of the stop pulse the same condition described above will exist except that the transfer tube 97 will not remain conducting for the period of time that it did under the first described condition. Under this condition, at the time that the delayed multiplex operating pulse is received, all impulse conditions reflected in the selector tubes which have been received prior to the multiplex operating pulse will be transferred to the storage tubes. Thereafter the transfer tube 97 will remain conducting during the remainder of the signal cycle allowing immediate transfer of any impulses received after it is rendered conducting. At such time as the stop interval occurs the tube 53 will be rendered conducting with the tube 97 being extinguished, all as described previously.

It might be noted with respect to the first described condition that if the delayed multiplex operating pulse is received during the start interval it will have the same effect as if it is received during one of the impulse intervals in that the transfer tube 97 will be rendered conducting and will remain conducting during the entire signal cycle causing an immediate transfer as the impulse conditions are received.

If the third above described condition exists, namely that the delayed multiplex operating pulse is received during the stop interval, a condition exists which may be different under different circumstances. If it be assumed that no preceding multiplex operating pulse has been received during the reception of the particular start-stop signal which impulse conditions are reflected in the completion of selections by the selector tubes 66 to 70, inclusive, upon the receipt of the delayed multiplex operating pulse during the stop interval the transfer tube 97 will be rendered conducting as described previously to effect a transfer to the storage tubes 86 to 90, inclusive. During this condition the output of the tube 97 will be directed to the conductor 103 and to the control grid of the latch tube 53. Inasmuch as during the stop interval the screen grid of the latch tube 53 has also become biased positively, the latch tube 53 will almost immediately be rendered conducting, delayed only by the necessity of charging the condenser in the control grid circuit of tube 53, and causing the transfer tube 97 to then be quickly extinguished as described. The transfer tube will have been conducting for a short definite period of time, long enough to insure that reliable signal transfers take place. Under this condition a rapid simultaneous signal transfer will be effected for the selected signals, which will then be transmitted over the multiplex system.

If under the above first mentioned condition it be assumed that a preceding delayed multiplex operating pulse had been received early in the signal cycle, such as during the start impulse interval as described with respect to the first condition above, the transfer tube 97 would be rendered conducting and a transfer of the signal selection would be made to the storage tubes 86 to 90, inclusive, during the receipt of the subsequent impulses. Thereafter, upon the stop interval being reached the latch tube 53 would be rendered conducting and the transfer tube 97 extinguished in a manner already described. If, however, a subsequent delayed multiplex operating pulse is now received during the stop interval just prior to the time that the next start impulse conditions tube 97, it will just miss causing the transfer tube 97 to be rendered conducting, and since the storage tubes 86 to 91 were extinguished by the application of the multiplex operating impulse to tubes 48 and 83, no marking storage can occur until the next multiplex operating impulse arrives just after the transmission of a blank storage character combination. This occurs because when the multiplex operates through the interval assigned for the transmission of signals received by the described apparatus there will be no signal conditions existing on the conductors 107 and therefore the multiplex transmitter must necessarily transmit a blank signal at this time. Normal transfers will then occur under condition three, described previously.

From the above description it may be seen that the present converter operates in conjunction with the associated multiplex transmitter to effect the conversion of start-stop signals to multiplex signals to allow proper transmission thereof. It may also be seen that because of the different speeds of operation of the multiplex apparatus and the start-stop apparatus that a condition may exist at variable intervals during which time the multiplex transmitter is in readiness to transfer a converted signal but that the start-stop apparatus does not have a signal in readiness for transference. Under this latter condition a blank or all spacing impulse signal will be transmitted automatically by the multiplex transmitter with the apparatus thereafter returning to normal operation for the transmission of start-stop signals which may be received by the converter.

In normal operation with the start-stop signals arriving periodically at their closest possible spacing the three described general conditions will occur in reverse order; that is, Nos. 3, 2 and 1. The aforementioned blank will be inserted in the transmitted multiplex signal at the time condition No. 3 succeeds condition No. 1. Thereafter, the transferral of signals from the selecting position to stored position will be on an instantaneous basis until the speed relationships bring about condition No. 2. Then, during condition No. 2 the transfer tube 97 will be rendered conducting for increasingly longer periods during successive cycles until condition No. 1 is reached and passed. Thereupon, condition No. 3 will be repeated following the insertion of the blank signal.

It should also be remembered that mention was made that the conductor 31 which impressed positive potential to the junction point 51 and over the conductor 52 during the stop interval also was connected to a conductor 54 and impressed positive potential to the grid of the left-hand portion of the biased multivibrator 56. During transfer conditions 1 and 2, described previously, the potentials of conductors 54 and 101 were varying in alternate manner, one being highly positive when the other had a low positive value, and vice-versa. Under condition 3, when a multiplex operating pulse is received during the stop interval, both conductors 54 and 101 will have the high positive potential causing the negative charge on the condenser 94 to leak away faster than under the other conditions; thereby allowing the biased multivibrator 56 to return to its normal condition at a quicker rate. This has the effect of causing operation of the transfer tube 97 at an earlier time than normal with less delay from the time of the receipt of the multiplex operating pulse and is done to assure that transfer of the signal set up in the selector tubes 66 to 70, inclusive, will occur well before the next start pulse so that no signals will be lost. Further, it also assures that the apparatus will be operated and returned to normal in proper time for operation upon receipt of the succeeding start-stop signal, even though the latter signal should occur somewhat earlier than normal due to external circumstances such as line signal distortion or a change in speed of the start-stop transmitter.

While a specific embodiment of the invention has been described utilizing specific circuit arrangements and components it is obvious that the invention is not limited to such specific arrangements and components but instead alterations and additions may be made within the scope and spirit of the invention.

What is claimed is:

1. In combination in a start-stop signal to multiplex signal converter, a multiplex transmitter a normally unoperative start-stop electronic distributor comprising a plurality of tubes, a normally unoperative start-stop electronic oscillator for operating said distributor to cause said tubes to be rendered conducting successively, code signal receiving means, said code signals including a start condition, means controlled by a start condition from said code signal receiving means for releasing said start-stop oscillator for operation for operating said distributor in synchronism with said signal receiving means, selector means controlled jointly by the code signals and said distributor tubes, storage means, means under the control of said multiplex transmitter for transferring the signal selection from said selector means to said storage means, and means forming a portion of said multiplex transmitter controlled by said storage means, whereby said multiplex transmitter will transmit multiplex signals in accordance with the signal selection stored in said storage means.

2. In combination in a start-stop to multiplex converter, a normally unoperative start-stop electronic distributor, a normally unoperative start-stop electronic oscillator for controlling said distributor, code signal receiving means, said code signals including a start condition, means controlled by a start condition from said code signal receiving means for releasing said start-stop oscillator for operation for operating said distributor in synchronism with said signal receiving means, means to distinguish between a start condition and a short hit for releasing or not releasing, respectively, said start-stop oscillator for operation, and means for transmitting multiplex signals in accordance with the signals received by said signal receiving means.

3. In combination in a start-stop to multiplex converter, a multiplex transmitter, means for receiving signals composed of a start impulse, a plurality of signal impulses and a stop impulse, a normally unoperative start-stop electronic distributor comprising a plurality of tubes, a normally unoperative electronic oscillator for operating said distributor to cause said tubes to be rendered conducting successively in synchronism with said signal receiving means, means for retaining said oscillator in its unoperative condition during a no signal condition in said signal receiving means and for releasing said oscillator for operation on receipt of a start impulse by said signal receiving means, selector means under the joint control of said signal receiving means and said distributor tubes, and means under the control of said multiplex transmitter for transferring the signals from said selector means to said multiplex transmitter, whereby said multiplex transmitter will transmit multiplex signals in accordance with the signal selection in said selector means.

4. In combination in a signal converting apparatus, a multiplex transmitter, start-stop signal receiving means, a start-stop distributor comprising a plurality of tubes, a start-stop oscillator to operate said distributor for causing said tubes to be rendered conducting successively in sychronism with said signal receiving means, means responsive to a signal received by said signal receiving means for operating said oscillator, a plurality of selector tubes each of which is under the joint control of the received signals and one of said distributor tubes, a plurality of storage tubes each of which is conditioned by one of said selector tubes, means for causing conditioned ones of said storage tubes to be rendered conducting, and means forming a portion of said multiplex transmitter controlled by said storage tubes, whereby said multiplex transmitter will transmit multiplex signals in accordance with the permutations stored in said storage tubes.

5. In combination in a signal converting apparatus, a multiplex transmitter, signal receiving means, a start-stop electronic distributor comprising a plurality of tubes, a start-stop electronic oscillator for operating said distributor to cause said tubes to be rendered conducting successively in synchronism with said signal receiving means, means responsive to a signal received by said signal receiving means for releasing said start-stop oscillator for operation, selector means under the joint control of said signal receiving means and said distributor tubes, means under the control of said multiplex transmitter for transferring the signals from said selector means to said multiplex transmitter, whereby said multiplex transmitter will transmit multiplex signals in accordance with the signal selections in said selector means, and means controlled by said distributor after it has completed a cycle for stopping further operation of said oscillator.

6. In combination in a start-stop to multiplex converter, a multiplex transmitter, means to receive start-stop signals which include a start impulse and a plurality of code impulses, a start-stop distributor comprising a start tube and a plurality of code impulse tubes, a start-stop oscillator to operate said distributor for causing said code impulse tubes to be rendered conducting successively in synchronism with the receipt of the plurality of code impulses, means responsive to the receipt by said signal receiving means of a start impulse for rendering conducting said start tube, means controlled by said start tube being rendered conducting for releasing said start-stop oscillator for operation, whereby said plurality of code impulse tubes will be rendered conducting successively for distributing the plurality of code impulses, and means including a portion of said multiplex transmitter controlled by the distribution of code impulses, whereby said multiplex transmitter will transmit multiplex signals in accordance with the distributed code impulses.

7. In apparatus for converting code signals having a control portion and an intelligence portion to signals having an intelligence portion only, in combination with apparatus for transmitting the signals having an intelligence portion only at a speed the same as or greater than the rate at which signals having both control and intelligence portions are received, means for receiving the signals having both control and intelligence portions, a start-stop electronic distributor comprising a plurality of tubes, a start-stop electronic oscillator for operating said distributor to cause said tubes to be rendered conducting successively in sychronism with said signal receiving means, means responsive to the control portion of a signal received by said signal receiving means for releasing said oscillator for operation, selector means under the joint control of the intelligence portion of the signal received by said signal receiving means and said distributor tubes, and means controlled by said transmission apparatus for effecting a transfer of the selection in said selector means to said transmission apparatus, whereby said transmission apparatus will transmit the signals.

8. In apparatus for converting code signals having a control portion and an intelligence portion to signals having an intelligence portion only, in combination with apparatus for transmitting the signals having an intelligence portion only at a speed the same as or greater than the rate at which signals having both control and intelligence portions are received, means for receiving the signals having both control and intelligence portions, a start-stop electronic distributor, a start-stop electronic oscillator for operating said distributor in synchronism with said receiving means, means responsive to the control portion of a signal received by said signal receiving means for releasing said oscillator for operation, selector means under the joint control of the intelligence portion of the signal received by said signal receiving means and said distributor, means to transfer the selection in said selector means to said transmitting apparatus for repeating the intelligence portions, and means for preventing a transfer from being effected when no selection occurs in said selector means because of the difference in speeds of reception and transmission, whereby said transmitting apparatus will transmit a blank signal.

9. In conversion apparatus, in combination with apparatus for transmitting the converted signals, a signal receiving means, a start-stop electronic distributor, a start-stop electronic oscillator for operating said distributor in synchronism with said signal receiving means, means controlled by a signal received by said signal receiving means for releasing said distributor for operation, selector means under the joint control of said signal receiving means and said distributor, means controlled by said transmission apparatus for effecting a transfer of signal conditions from said selector means to said transmitting apparatus for signal transmission, and variable timing means forming a portion of said means for effecting a transfer.

10. In conversion apparatus, in combination with apparatus for transmitting the converted signals, signal receiving means, a start-stop electronic distributor, a start-stop electronic oscillator for operating said distributor in synchronism with said signal receiving means, means controlled by a signal received by said signal receiving means for releasing said distributor for operation, selector means under the joint control of said signal receiving means and said distributor, means controlled by said transmission apparatus for effecting a transfer of signal conditions from said selector means to said transmitting apparatus for signal transmission, variable timing means forming a portion of said means for effecting a transfer, and means for causing variable operation of said timing means when a particular phase condition exists between the signals received by said signal receiving means and the signals transmitted by said transmitting apparatus.

11. In combination in a start-stop to multiplex converter, a multiplex transmitter, signal receiving means, a normally unoperative start-stop electronic distributor comprising a plurality of tubes, a start-stop electronic oscillator for operating said distributor to cause said tubes to be rendered conducting successively in synchronism with said signal receiving means, oscillator control means for normally retaining said oscillator in an unoperative condition, means controlled by the receipt of a signal in said signal receiving means for controlling said oscillator control means to release said oscillator for operation, selector means under the joint control of said signal receiving means and said distributor tubes, means under the control of said multiplex transmitter for transferring the signals from said selector means to said multiplex transmitter for transmission by said multiplex transmitter, and means controlled by said start-stop distributor at the completion of a cycle of its operation for controlling said oscillator control means, whereby said oscillator will be returned to its normal unoperative condition.

12. In combination in a start-stop to multiplex converter, a multiplex transmitter, signal receiving means, a normally unoperative start-stop electronic distributor comprising a plurality of tubes, a normally unoperative start-stop electronic oscillator for operating said distributor to cause said tubes to be rendered conducting successively in synchronism with said signal receiving means, means for releasing said oscillator for operation, variable means controlled by the receipt of a signal in said signal receiving means for controlling said oscillator release means to release said oscillator for operation, selector means under the joint control of said signal receiving means and said distributor tubes, and means under the control of said multiplex transmitter for transferring the signals from said selector means to said multiplex transmitter for transmission by said multiplex transmitter.

13. In combination in a signal converting apparatus, a multiplex transmitter, start-stop signal receiving means, a start-stop distributor comprising a plurality of tubes, a start-stop oscillator to operate said distributor for causing said tubes to be rendered conducting successively in synchronism with said signal receiving means, means responsive to a signal received by said signal receiving means for operating said oscillator, a plurality of selector tubes each of which is under the joint control of the received signals and one of said distributor tubes, a plurality of storage tubes each of which is conditioned by one of said selector tubes, means for causing conditioned ones of said storage tubes to be rendered conducting, means forming a portion of said multiplex transmitter controlled by said storage tubes, whereby said multiplex transmitter will transmit multiplex signals in accordance with the permutations stored in said storage tubes, and means controlled by said multiplex transmitter for extinguishing conducting ones of said storage tubes.

14. In combination in a signal converting apparatus, a multiplex transmitter, start-stop signal receiving means, a start-stop distributor comprising a plurality of tubes, a start-stop oscillator to operate said distributor for causing said tubes to be rendered conducting successively in synchronism with said signal receiving means, means responsive to a signal received by said signal receiving means for operating said oscillator, a plurality of selector tubes each of which is under the joint control of the received signals and one of said distributor tubes, a plurality of storage tubes each of which is conditioned by one of said selector tubes, means for causing conditioned ones of said storage tubes to be rendered conducting, means forming a portion of said multiplex transmitter controlled by said storage tubes, whereby said multiplex transmitter will transmit multiplex signals in accordance with the permutations stored in said storage tubes, and means controlled by said start-stop distributor for releasing selected ones of said selector tubes.

15. In combination in a start-stop to multiplex converter, a multiplex transmitter, start-stop signal receiving means, a start-stop distributor comprising a plurality of tubes, a start-stop oscillator to operate said distributor for causing said tubes to be rendered conducting successively in synchronism with said signal receiving means, means responsive to a signal received by said signal receiving means for operating said oscillator, a plurality of selector tubes each of which is under the joint control of the received signals and one of said distributor tubes, means controlled by said multiplex transmitter for effecting a transfer of signal conditions from said selector means to said multiplex transmitter for signal transmission, variable timing means forming a portion of said means for effecting a transfer, and means for causing variable operation of said timing means when a particular phase condition exists between the signals received by said signal receiving means and the signals transmitted by said multiplex transmitter.

16. In conversion apparatus, in combination with apparatus for transmitting the converted signals, signal receiving means for receiving signals at a speed the same as or slower than that at which the converted signals will be transmitted by said transmitting apparatus, signal storage means controlled by said signal receiving means, and variable timing means for effecting a transfer of signal conditions from said signal storage means to said transmitting apparatus for transmitting such signal conditions, said variable timing means including electronic elements which are controlled by said signal receiving means and electronic elements which are controlled by said transmitting apparatus, whereby variable transfer timing occurs in accordance with the phase conditions between the signals received by said signal receiving means and the signals transmitted by said transmitting apparatus.

17. In conversion apparatus, in combination with apparatus for transmitting the converted signals, signal receiving means for receiving signals at a speed the same as or slower than that at which the converted signals will be transmitted by said transmitting apparatus, signal storage means controlled by said signal receiving means, and variable timing means for effecting a transfer of signal conditions from said signal storage means to said transmitting apparatus for transmitting such signal conditions, said variable timing means including electronic elements which are controlled jointly by said signal receiving means and said transmitting apparatus, whereby variable transfer timing occurs in accordance with the phase conditions between the signals received by said signal receiving means and the signals transmitted by said transmitting apparatus.

18. In conversion apparatus, in combination with apparatus for transmitting the converted signals, signal receiving means for receiving signals at a speed the same as or slower than that at which the converted signals will be transmitted by said transmitting apparatus, signal storage means controlled by said signal receiving means, variable timing means for effecting a transfer of signal conditions from said signal storage means to said transmitting apparatus for transmitting such signal conditions, said variable timing means including electronic elements which are controlled by said signal receiving means and electronic elements which are controlled by said transmitting apparatus, whereby variable transfer timing occurs in accordance with the phase conditions between the signals received by said signal receiving means and the signals transmitted by said transmitting apparatus, and means for causing said variable timing means to operate to advance the transfer of the signal conditions from said signal storage means to said transmitting apparatus when a predetermined phase condition exists.

19. In conversion apparatus, in combination with apparatus for transmitting the converted signals, signal receiving means for receiving signals at a speed the same as or slower than that at which the converted signals will be transmitted by said transmitting apparatus, signal storage means controlled by said signal receiving means, variable timing means for effecting a transfer of signal conditions from said signal storage means to said transmitting apparatus for transmitting such signal conditions, said variable timing means including electronic elements which are controlled jointly by said signal receiving means and said transmitting apparatus, whereby variable transfer timing occurs in accordance with the phase conditions between the signals received by said signal received means and the signals transmitted by said transmitting apparatus, and means for causing said variable timing means to operate to advance the transfer of the signal conditions from said signal storage means to said transmitting apparatus when a predetermined phase condition exists.

20. In combination in signal converting apparatus, a multiplex transmitter, start-stop signal receiving means, a start-stop distributor comprising a plurality of tubes, a start-stop oscillator to operate said distributor for causing said tubes to be rendered conducting successively in synchronism with said signal receiving means, means responsive to a signal received by said signal receiving means for operating said oscillator, a plurality of selector tubes each of which is under the joint control of the received signals and one of said distributor tubes, and means under the control of said multiplex transmitter for transferring the signals from said selector tubes to said multiplex transmitter, whereby said multiplex transmitter will transmit multiplex signals in accordance with the signal selections in said selector tubes.

21. In combination in signal converting apparatus, a multiplex transmitter, start-stop signal receiving means, a start-stop distributor comprising a plurality of electron discharge devices, a start-stop oscillator to operate said distributor for causing said discharge devices to be operated successively in synchronism with said signal receiving means, means responsive to a signal received by said signal receiving means for operating said oscillator, a plurality of selector tubes each of which is under the joint control of the received signals and one of said discharge devices, and means under the control of said multiplex transmitter for transferring the signals from said selector tubes to said multiplex transmitter, whereby said multiplex transmitter will transmit multiplex signals in accordance with the signal selections in said selector tubes.

RANSOM D. SLAYTON.

REFERENCES CITED

The following references are of record in the file of this patent:

UNITED STATES PATENTS

| Number | Name | Date |
|---|---|---|
| 1,561,526 | Vernam | Nov. 17, 1925 |
| 1,880,906 | Duerr | Oct. 4, 1932 |
| 2,433,362 | Hartley | Dec. 30, 1947 |
| 2,438,492 | Bascom | Mar. 30, 1948 |